(12) United States Patent
Torgilsson et al.

(10) Patent No.: US 11,059,523 B2
(45) Date of Patent: Jul. 13, 2021

(54) ADJUSTABLE DATUM PIN ASSEMBLY FOR TEMPORARILY SECURING A VEHICLE COMPONENT TO A VEHICLE STRUCTURE

(71) Applicant: Volvo Car Corporation, Gothenburg (SE)

(72) Inventors: Mikael Torgilsson, Gothenburg (SE); Mirko Milesic, Gothenburg (SE); Oliver Angelöv, Gothenburg (SE); Darko Dekic, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 52 days.

(21) Appl. No.: 16/441,113

(22) Filed: Jun. 14, 2019

(65) Prior Publication Data

US 2020/0391807 A1    Dec. 17, 2020

(51) Int. Cl.
| | |
|---|---|
| *B65D 65/02* | (2006.01) |
| *B62D 27/02* | (2006.01) |
| *B62D 25/16* | (2006.01) |
| *B62D 21/12* | (2006.01) |
| *B62D 25/02* | (2006.01) |
| *B62D 65/02* | (2006.01) |

(52) U.S. Cl.
CPC ........... *B62D 27/023* (2013.01); *B62D 21/12* (2013.01); *B62D 25/02* (2013.01); *B62D 25/163* (2013.01); *B62D 65/024* (2013.01)

(58) Field of Classification Search
CPC .................................................. B62D 65/024
See application file for complete search history.

(56) References Cited

U.S. PATENT DOCUMENTS

| | | | |
|---|---|---|---|
| 6,209,935 B1 * | 4/2001 | Kavc | B60R 19/12 293/102 |
| 6,695,396 B1 | 2/2004 | Schwab | |
| 7,644,966 B2 | 1/2010 | Huber et al. | |
| 8,448,337 B2 * | 5/2013 | Stablo | B62D 65/02 29/897.2 |
| 8,720,982 B2 | 5/2014 | Dupont et al. | |
| 8,888,170 B2 * | 11/2014 | McCuller | E05F 5/022 296/193.11 |
| 9,283,907 B2 * | 3/2016 | Farrington | B60R 19/24 |
| 10,093,257 B2 | 10/2018 | Vanlooy, Jr. et al. | |
| 2014/0161516 A1 * | 6/2014 | Deumer | E04F 13/0823 403/345 |

* cited by examiner

*Primary Examiner* — Jason S Morrow
*Assistant Examiner* — Kevin P Weldon
(74) *Attorney, Agent, or Firm* — Clements Bernard Walker; Christopher L. Bernard

(57) ABSTRACT

An adjustable datum pin assembly for temporarily affixing a bumper cover, fender, side panel, roof spoiler, or the like (i.e., a vehicle component) to an associated vehicle structure, the adjustable datum pin assembly including: a fixed lower portion adapted to be coupled to the associated vehicle structure; a translatable upper portion translatably coupled to the fixed lower portion, wherein the translatable upper portion includes an attachment structure adapted to be coupled to the bumper cover, fender, side panel, roof spoiler, or the like; and a friction mechanism disposed between the translatable upper portion and the fixed lower portion adapted to resist translation of the translatable upper portion with respect to the fixed lower portion.

20 Claims, 12 Drawing Sheets

ADJUSTABLE DATUM PIN ASSEMBLY FOR TEMPORARILY SECURING A VEHICLE COMPONENT TO A VEHICLE STRUCTURE

TECHNICAL FIELD

The present disclosure relates generally to the automotive manufacturing field. More particularly, the present disclosure relates generally to an adjustable datum pin assembly for temporarily securing a bumper cover, fender, side panel, roof spoiler, or the like to a vehicle structure and ensuring a precise (adjustable) gap between an upper edge of the bumper cover, fender, side panel, roof spoiler, or the like and a hood or trunk lid of a vehicle.

BACKGROUND

In the automotive manufacturing field, it is desirable that precise gaps be formed between the various exterior panels of a vehicle, and especially between the upper edge of the bumper cover, fender, side panel, or roof spoiler and the hood or trunk lid of the vehicle, both of which may be opened and closed. Such bumper cover, fender, side panel, or roof spoiler typically includes a plurality of holes along its upper edge and is temporarily "hung" on a plurality of fixed post structures coupled to the associated vehicle structure, such as a crossmember present in the engine compartment of the vehicle or frame member present in the rear hatch area of the vehicle, for example. Alternatively, such bumper cover, fender, side panel, or roof spoiler includes a plurality of tab structures along its upper edge that are temporarily inserted into corresponding receptacle structures coupled to the associated vehicle structure. Subsequently, the bumper cover, fender, side panel, or roof spoiler is permanently secured to the vehicle structure using screws or the like. Thus, these holes and fixed post structures or tab structures and corresponding receptacle structures provide means to temporarily hold the bumper cover, fender, side panel, or roof spoiler in place before the screws are placed.

Disadvantageously, the holes and fixed post structures provide no "play" for adjusting the gap between the bumper cover, fender, side panel, or roof spoiler and the hood or trunk lid when the bumper cover, fender, side panel, or roof spoiler is temporarily "hung" on the associated vehicle structure. Similarly, the tab structures and corresponding receptacle structures are unidirectional, meaning that the bumper cover, fender, side panel, or roof spoiler can be "snugged" against the associated vehicle structure, but cannot subsequently be backed away from the associated vehicle structure before permanently securing the bumper cover, fender, side panel, or roof spoiler to the associated vehicle structure with screws or the like.

It is desirable that a certain degree of adjustability be provided between the bumper cover, fender, side panel, or roof spoiler and the associated vehicle structure, such that the bumper cover, fender, side panel, or roof spoiler can be "snugged" against the associated vehicle structure and held in place while the gap with the closed hood or trunk lid is checked, at which point the bumper cover, fender, side panel, or roof spoiler can be adjusted towards or away from the associated vehicle structure to achieve the desired gap and again held in place, etc., all prior to permanently securing the bumper cover, fender, side panel, or roof spoiler to the associated vehicle structure with screws or the like. Thus, it is desirable that the temporary securement mechanism between the bumper cover, fender, side panel, or roof spoiler and the associated vehicle structure be provided with a degree of adjustability, prior to the permanent securement mechanism being utilized. In this manner, temporary spacers or the like can be fitted and re-fitted between the bumper cover, fender, side panel, or roof spoiler and the hood or trunk lid to ensure a precise gap therebetween.

SUMMARY

In various exemplary embodiments, the present disclosure provides an adjustable datum pin assembly that is coupled to the vehicle structure, such as a crossmember present in the engine compartment of the vehicle or frame member present in the rear hatch area of the vehicle, for example. The bumper cover, fender, side panel, roof spoiler, or the like (i.e., the vehicle component) is temporarily "hung" on this adjustable datum pin assembly, which includes a fixed lower portion and a translatable upper portion. Relative translation of the translatable upper portion with respect to the fixed lower portion is resisted via an intervening friction mechanism or the like, such that a sufficient actuating force is required to translate the translatable upper portion with respect to the fixed lower portion. In this manner, the bumper cover, fender, side panel, roof spoiler, or the like may be temporarily "hung" on this adjustable datum pin assembly and pressed towards the closed hood or trunk lid until an intervening spacer that ensures proper gap width is contacted, at which point the hood or trunk lid may be opened, with the adjustable datum pin assembly and bumper cover, fender, side panel, roof spoiler, or the like maintaining the proper gap width position. Thus, a degree of adjustability in the adjustable datum pin assembly and the "hanging" of the bumper cover, fender, side panel, roof spoiler, or the like is provided, with proper gap width with the hood or trunk lid being subsequently maintained prior to permanent securement of the bumper cover, fender, side panel, roof spoiler, or the like to the associated vehicle structure using screws or the like.

The translatable upper portion of the adjustable datum pin assembly is translatably secured to the fixed lower portion using a track-and-rail mechanism, with the friction mechanism disposed between the two components. A locking mechanism may also be provided. In general, the fixed lower portion of the adjustable datum pin assembly is secured to the vehicle structure using a screw, clip mechanism, and/or the like. Finally, the bumper cover, fender, side panel, roof spoiler, or the like may be "hung" on the adjustable datum pin assemblies used via holes along the upper edge thereof and corresponding post structures coupled to the translatable upper portions of the adjustable datum pin assemblies. Other suitable attachment mechanisms may also be used.

In one exemplary embodiment, the present disclosure provides an adjustable datum pin assembly for temporarily affixing a bumper cover, fender, side panel, roof spoiler, or the like (i.e., a vehicle component) to an associated vehicle structure, the adjustable datum pin assembly including: a fixed lower portion adapted to be coupled to the associated vehicle structure; a translatable upper portion translatably coupled to the fixed lower portion, wherein the translatable upper portion includes an attachment structure adapted to be coupled to the bumper cover, fender, side panel, roof spoiler, or the like; and a friction mechanism disposed between the translatable upper portion and the fixed lower portion adapted to resist translation of the translatable upper portion with respect to the fixed lower portion. The fixed lower portion includes one of a screw mechanism and a clip mechanism adapted to couple to the fixed lower portion to the associated vehicle structure. The translatable upper portion is translatably coupled to the fixed lower portion via a track-and-rail mechanism. The attachment structure includes one of a post structure adapted to be disposed within a corresponding hole formed along an upper edge of the bumper cover, fender, side panel, roof spoiler, or the like and a retainer structure adapted to receive a corresponding tab structure coupled to the upper edge of the bumper cover, fender, side panel, roof spoiler, or the like. The friction mechanism includes a plurality of friction structures formed in one or more of a lower surface of the translatable upper portion and an upper surface of the fixed lower portion. Optionally, the adjustable datum pin assembly further includes a locking mechanism adapted to prevent translation of the translatable upper portion with respect to the fixed lower portion.

In another exemplary embodiment, the present disclosure provides a method for affixing a bumper cover, fender, side panel, roof spoiler, or the like (i.e., a vehicle component) to an associated vehicle structure, the method including: coupling the bumper cover, fender, side panel, roof spoiler, or the like to one or more adjustable datum pin assemblies secured to the associated vehicle structure, wherein each of the one or more adjustable datum pin assemblies includes: a fixed lower portion adapted to be coupled to the associated vehicle structure; a translatable upper portion translatably coupled to the fixed lower portion, wherein the translatable upper portion includes an attachment structure adapted to be coupled to the bumper cover, fender, side panel, roof spoiler, or the like; and a friction mechanism disposed between the translatable upper portion and the fixed lower portion adapted to resist translation of the translatable upper portion with respect to the fixed lower portion; and adjusting the relative position of the bumper cover, fender, side panel, roof spoiler, or the like with respect to the associated vehicle structure by translating the translatable upper portion(s) of the one or more adjustable datum pin assemblies with respect to the fixed lower portion(s) of the one or more adjustable datum pin assemblies with a sufficient amount of force to achieve a desired gap between an upper edge of the bumper cover, fender, side panel, roof spoiler, or the like and an adjacent hood, trunk lid, or the like. The method further includes, subsequent to adjusting the relative position of the bumper cover, fender, side panel, roof spoiler, or the like with respect to the associated vehicle structure, securing the bumper cover, fender, side panel, roof spoiler, or the like to the associated vehicle structure using one or more screws.

Adjusting the relative position of the bumper cover, fender, side panel, roof spoiler, or the like with respect to the associated vehicle structure by translating the translatable upper portion(s) of the one or more adjustable datum pin assemblies with respect to the fixed lower portion(s) of the one or more adjustable datum pin assemblies with a sufficient amount of force to achieve the desired gap between the upper edge of the bumper cover, fender, side panel, roof spoiler, or the like and the adjacent hood, trunk lid, or the like includes, optionally, "pinching" one or more removable spacers between the upper edge of the bumper cover, fender, side panel, roof spoiler, or the like and the adjacent hood, trunk lid, or the like. Simple visual alignment may also be utilized, without the removable spacers.

The fixed lower portion includes one of a screw mechanism and a clip mechanism adapted to couple to the fixed lower portion to the associated vehicle structure. The translatable upper portion is translatably coupled to the fixed lower portion via a track-and-rail mechanism. The attachment structure includes one of a post structure adapted to be disposed within a corresponding hole formed along an upper edge of the bumper cover, fender, side panel, roof spoiler, or the like and a retainer structure adapted to receive a corresponding tab structure coupled to the upper edge of the bumper cover, fender, side panel, roof spoiler, or the like. The friction mechanism includes a plurality of friction structures formed in one or more of a lower surface of the translatable upper portion and an upper surface of the fixed lower portion. Optionally, the adjustable datum pin assembly further includes a locking mechanism adapted to prevent translation of the translatable upper portion with respect to the fixed lower portion. Optionally, the method further includes locking the translatable upper portion of the adjustable datum pin assembly to the fixed lower portion of the adjustable datum pin assembly after adjusting the relative position of the bumper cover, fender, side panel, roof spoiler, or the like with respect to the associated vehicle structure.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, in various exemplary embodiments, the present disclosure provides an adjustable datum pin assembly that is coupled to the vehicle structure, such as a crossmember present in the engine compartment of the vehicle or frame member present in the rear hatch area of the vehicle, for example. The bumper cover, fender, side panel, roof spoiler, or the like (i.e., the vehicle component) is temporarily "hung" on this adjustable datum pin assembly, which includes a fixed lower portion and a translatable upper portion. Relative translation of the translatable upper portion with respect to the fixed lower portion is resisted via an intervening friction mechanism or the like, such that a sufficient actuating force is required to translate the translatable upper portion with respect to the fixed lower portion. In this manner, the bumper cover, fender, side panel, roof spoiler, or the like may be temporarily "hung" on this adjustable datum pin assembly and pressed towards the closed hood or trunk lid until an intervening spacer that ensures proper gap width is contacted, at which point the hood or trunk lid may be opened, with the adjustable datum pin assembly and bumper cover, fender, side panel, roof spoiler, or the like maintaining the proper gap width position. Thus, a degree of adjustability in the adjustable datum pin assembly and the "hanging" of the bumper cover, fender, side panel, roof spoiler, or the like is provided, with proper gap width with the hood or trunk lid being subsequently maintained prior to permanent securement of the bumper cover, fender, side panel, roof spoiler, or the like to the associated vehicle structure using screws or the like.

The translatable upper portion of the adjustable datum pin assembly is translatably secured to the fixed lower portion using a track-and-rail mechanism, with the friction mechanism disposed between the two components. A locking mechanism may also be provided. In general, the fixed lower portion of the adjustable datum pin assembly is secured to the vehicle structure using a screw, clip mechanism, and/or the like. Finally, the bumper cover, fender, side panel, roof spoiler, or the like may be "hung" on the adjustable datum pin assemblies used via holes along the upper edge thereof and corresponding post structures coupled to the translatable upper portions of the adjustable datum pin assemblies. Other suitable attachment mechanisms may also be used. It will be noted that, although a bumper cover, fender, side panel, roof spoiler, or the like and a crossmember or frame member are specifically mention herein, by way of example, the adjustable datum pin assembly can be used to join any vehicle component to any vehicle structure that are similarly adjusted and then secured, without limitation.

Figure 1:
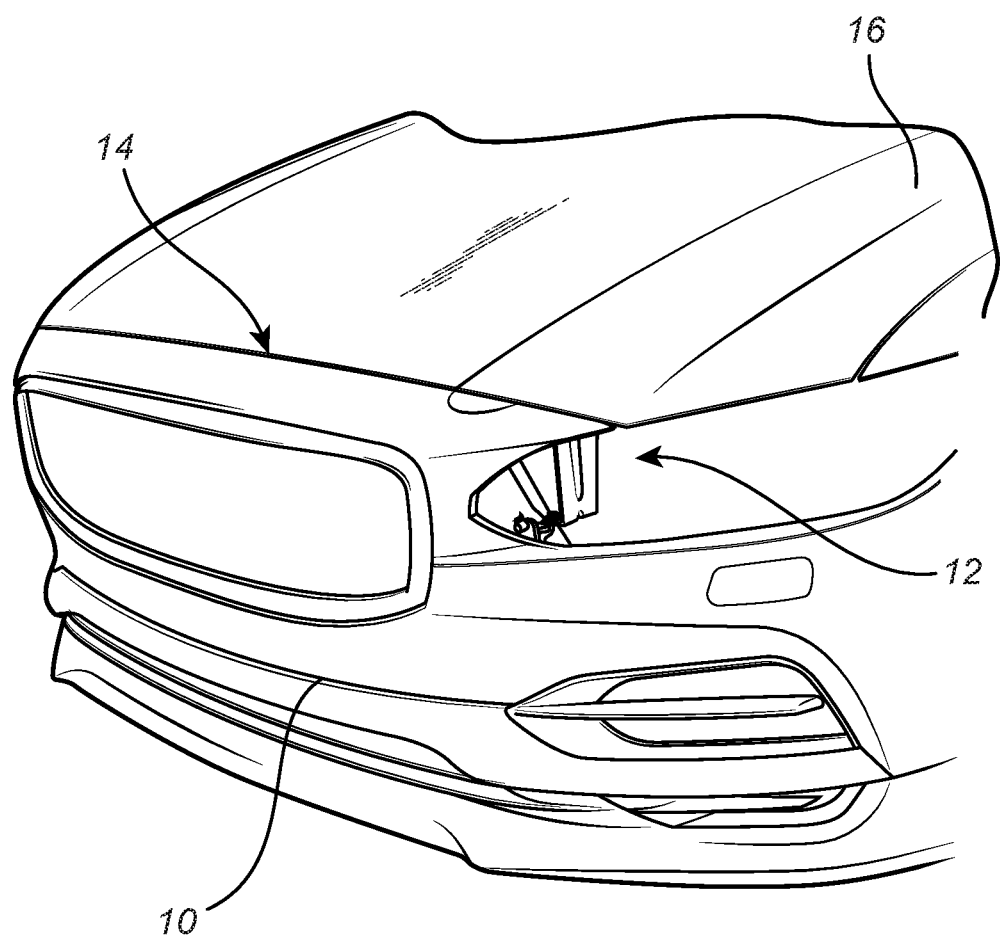
FIG. 1 is a perspective view of a bumper cover temporarily or permanently affixed to the associated vehicle structure of a vehicle with the hood in a closed configuration, forming a desired gap between the bumper cover and the hood.

Referring now specifically to FIG. 1, a front bumper cover 10 is illustrated installed on the associated vehicle structure 12 forming a gap 14 between the front bumper cover 10 and the hood 16 of the vehicle. From an aesthetics (and functional) point of view, it is important that this gap 14 is small and consistent. This is somewhat difficult to achieve during the manufacturing process as the hood 16 is variously opened and closed. As alluded to above, the front bumper cover 10 typically includes a plurality of holes along its upper edge and is temporarily "hung" on a plurality of fixed post structures coupled to the associated vehicle structure 12, such as a crossmember present in the engine compartment of the vehicle, for example. Alternatively, the front bumper cover 10 may include a plurality of tab structures along its upper edge that are temporarily inserted into corresponding receptacle structures coupled to the associated vehicle structure 12. Subsequently, the front bumper cover 10 is permanently secured to the vehicle structure 12 using screws or the like. Thus, these holes and fixed post structures or tab structures and corresponding receptacle structures provide means to temporarily hold the front bumper cover 10 before the screws are placed.

Disadvantageously, the holes and fixed post structures provide no "play" for adjusting the gap 14 between the front bumper cover 10 and the hood 16 when the front bumper cover 10 is temporarily "hung" on the associated vehicle structure 12. Similarly, the tab structures and corresponding receptacle structures are unidirectional, meaning that the front bumper cover 10 can be "snugged" against the associated vehicle structure 12, but cannot subsequently be backed away from the associated vehicle structure 12 before permanently securing the front bumper cover 10 to the associated vehicle structure 12 with screws or the like.

The adjustable datum pin assembly of the present disclosure provides a certain degree of adjustability between the front bumper cover 10 the associated vehicle structure 12, such that the front bumper cover 10 can be "snugged" against the associated vehicle structure 12 and held in place while the gap 14 with the closed hood 16 is checked, at which point the front bumper cover 10 can be adjusted towards or away from the associated vehicle structure 12 to achieve the desired gap 14 and again held in place, etc., all prior to permanently securing the front bumper cover 10 to the associated vehicle structure 12 with screws or the like.

Thus, the temporary securement mechanism between the front bumper cover 10 and the associated vehicle structure 12 is provided with a degree of adjustability, prior to the permanent securement mechanism being utilized. In this manner, temporary spacers or the like can be fitted and re-fitted between the front bumper cover 10 and the hood 16 to ensure a precise gap 14 therebetween.

Figure 2:
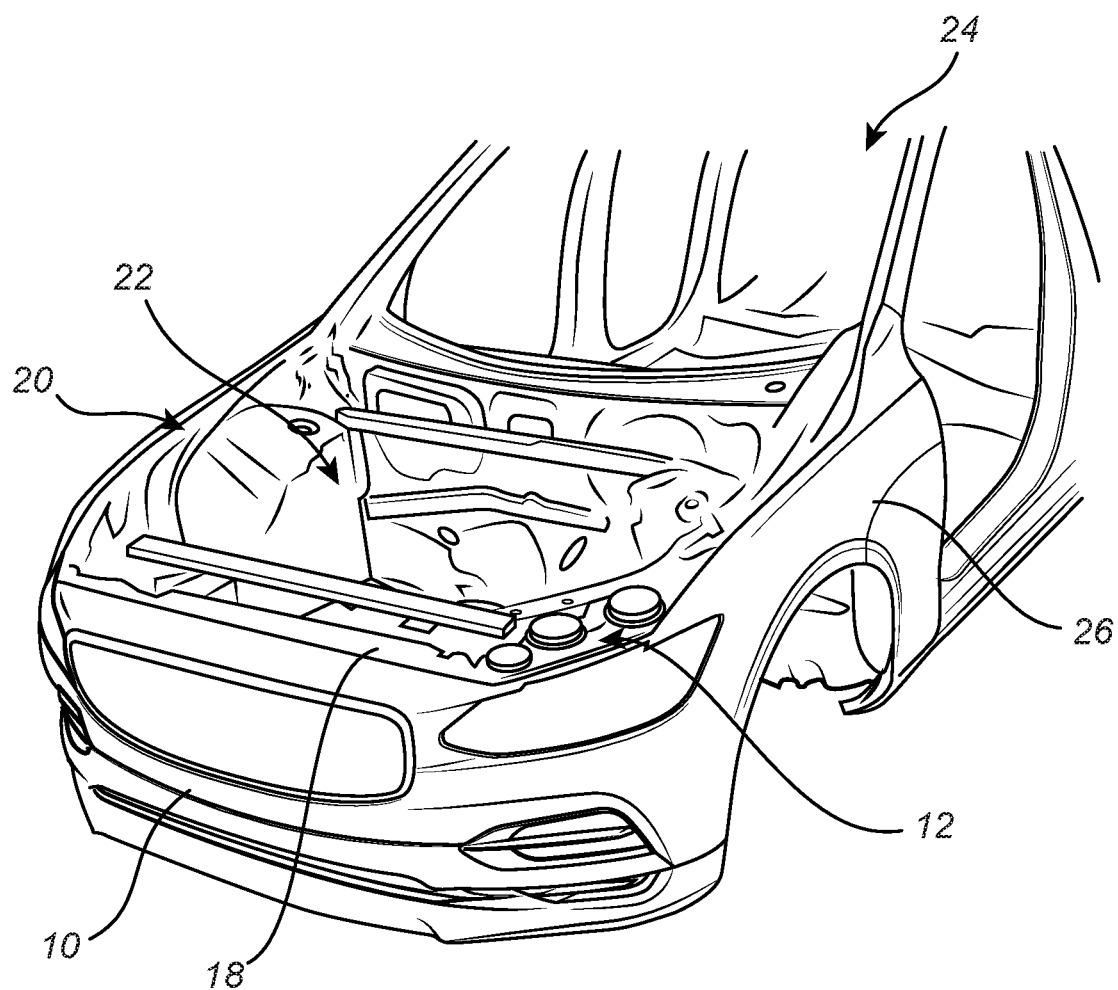
FIG. 2 is a perspective view of a bumper cover and side panel temporarily affixed to the associated vehicle structure of a vehicle with the hood removed, highlighting the locations of conventional datum pins or clips and the adjustable datum pin assemblies of the present disclosure.

FIG. 2 shows exemplary locations of the adjustable datum pin assemblies along the front crossmember 18 and side rails 20 of the engine (or front) compartment 22 of a vehicle 24 for the attachment of the front bumper cover 10 and a side panel 26, respectively. It will be readily apparent to those of ordinary skill in the art that other locations could be used to attach other components to other vehicle structures equally using the same mechanisms and methodologies.

Figure 3:
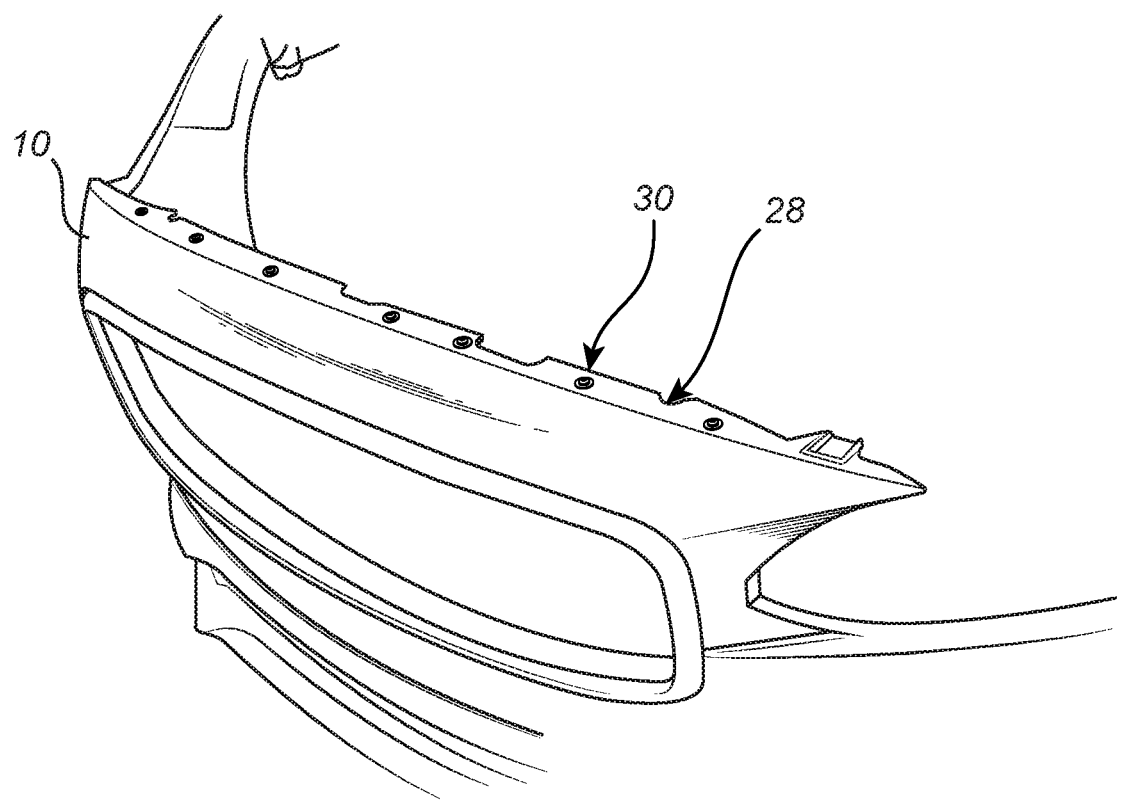
FIG. 3 is a perspective view of a bumper cover, highlighting the locations of the holes along the upper edge thereof that are "hung" on the adjustable datum pin assemblies of the present disclosure, thereby temporarily securing the bumper cover to the associated vehicle structure.

FIG. 3 shows the various holes 28, 30 along the upper edge of the front bumper cover 10 by which the front bumper cover 10 is "hung" on the adjustable datum pin assemblies and ultimately permanently secured to the underlying crossmember 18 (FIG. 2) using screws or the like. Any suitable configuration may be used for such holes 28, 30.

Figure 4:
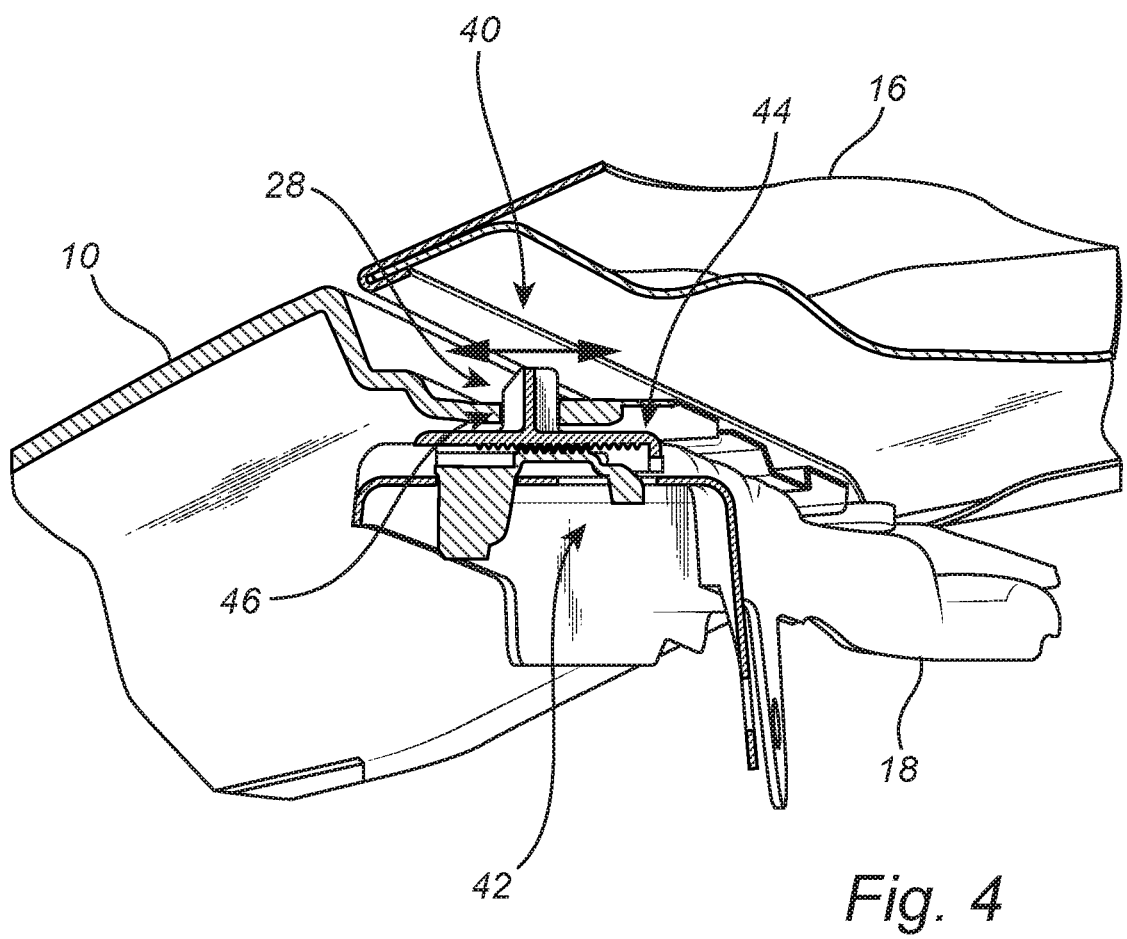
FIG. 4 is a perspective view of one exemplary embodiment of the adjustable datum pin assembly of the present disclosure, highlighting the relative translation of the translatable upper portion with respect to the fixed lower portion, the attachment of the bumper cover to the translatable upper portion, the attachment of the fixed lower portion to the associated vehicle structure, and the relative positioning of the hood in a closed configuration.

Referring now specifically to FIG. 4, in one exemplary embodiment, the adjustable datum pin assembly 40 includes a fixed lower portion 42 that is securely coupled to the crossmember 18 (or other vehicle structure) and a translatable upper portion 44 that is translatably coupled to the fixed lower portion 42. In general, the translatable upper portion 44 is permitted to translate in both directions along a single axis, such as forwards and rearwards with respect to the vehicle 24 (FIG. 2) in the case of an adjustable datum pin assembly 40 intended to hold a front bumper cover 10. Other directional axes may be utilized for the securement of other components. The fixed lower portion 42 and the translatable upper portion 44 are each manufactured from a substantially rigid plastic or metallic material and, optionally, consist of substantially planar structures. As is described in greater detail herein below, the fixed lower portion 42 includes a hole through which a screw is used to secure the fixed lower portion 42 to the crossmember 18 or, alternatively, a clip structure protrudes from the lower surface of the fixed lower portion 42 and is used to secure the fixed lower portion 42 to the crossmember 18. The translatable upper portion 44 includes a post structure or clip structure 46 that protrudes from the upper surface of the translatable upper portion 44 and selectively engages a corresponding hole 28 (FIG. 3) formed in the upper edge of the front bumper cover 10, thereby coupling the front bumper cover 10 to the translatable upper portion 44.

The translatable upper portion 44 is translatably coupled to the fixed lower portion 42 via a track-and-rail mechanism manufactured into the sides of the translatable upper portion 44 and the fixed lower portion 42. Translation of the translatable upper portion 44 with respect to the fixed lower portion 42 may be bounded by a stop structure disposed at one or both ends of the translatable upper portion 44. A friction mechanism consisting of a plurality of friction structures or teeth formed in one or more of a lower surface of the translatable upper portion 44 and an upper surface of the fixed lower portion 42 is provided to resist translation of the translatable upper portion 44 with respect to the fixed lower portion 42 unless a sufficient force is applied to the translatable upper portion 44 through the post or clip structure 46. Thus, the friction mechanism may provide a plurality of detent positions of the translatable upper portion 44 with respect to the fixed lower portion 42, or a substantially continuous relative position spectrum may be provided. Finally, a locking screw or other mechanism may be used to secure the translatable upper portion 44 with respect to the fixed lower portion 42 in a desired translation configuration, such as when the front bumper cover 10 is in a desired position with respect to the crossmember 18.

Figure 5:
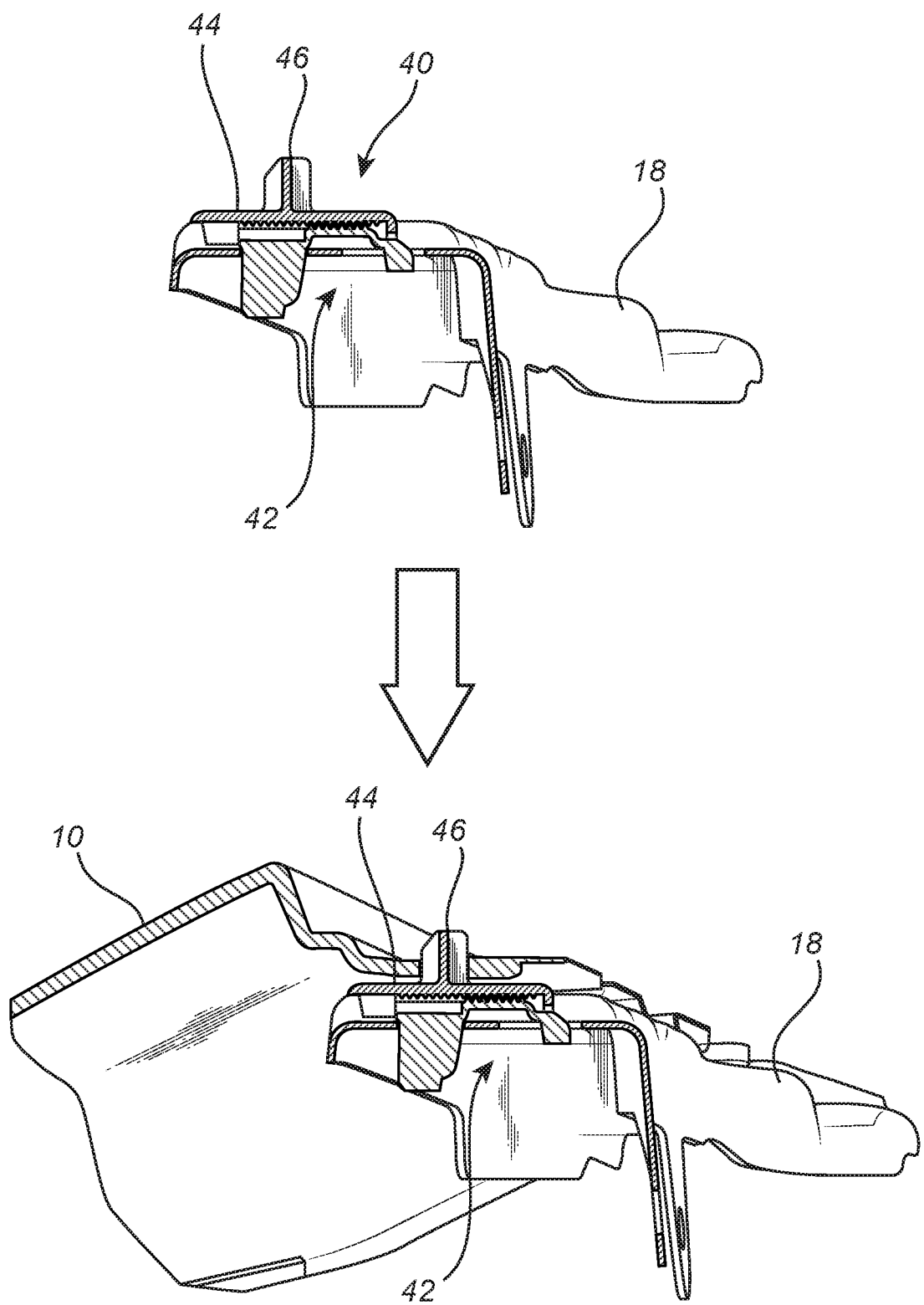
FIG. 5 is a series of perspective views of one exemplary embodiment of the adjustable datum pin assembly of the present disclosure, highlighting the attachment of the bumper cover to the translatable upper portion and the attachment of the fixed lower portion to the associated vehicle structure, in multiple steps.

FIG. 5 shows multiple steps in which the fixed lower portion 42 of the datum bracket 40 is first rigidly secured to the crossmember 18 using a screw or other clip mechanism. Subsequently, the front bumper cover 10 (or other component) is removably secured to the translatable upper portion 44 of the datum bracket 40 by fitting the corresponding hole 28 (FIG. 3) over or into the post or clip structure 46 of the translatable upper portion 42. At this point, the front bumper cover 10 is adjustably coupled to the crossmember 18.

Figure 6:
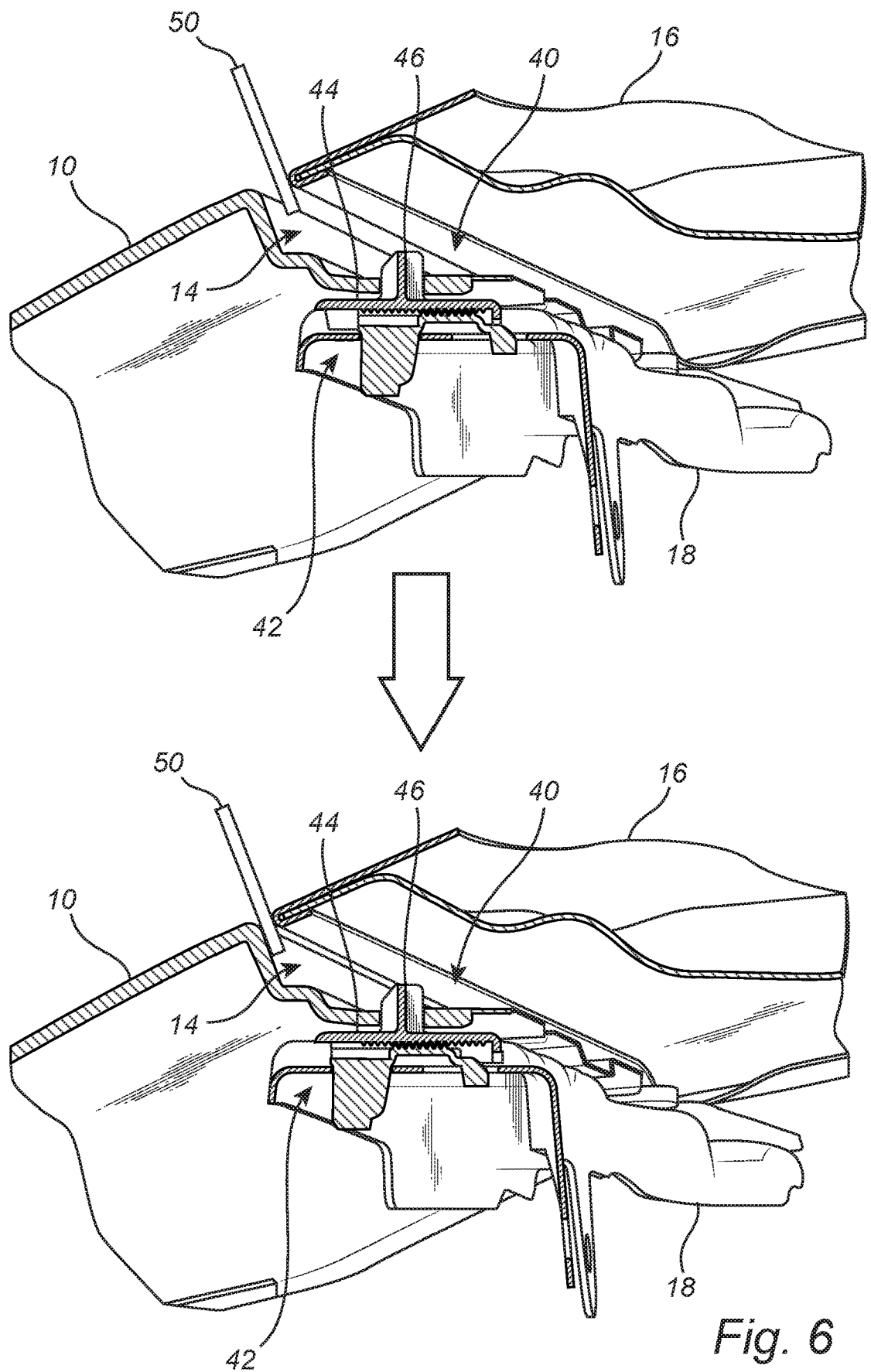
FIG. 6 is a series of perspective views of one exemplary embodiment of the adjustable datum pin assembly of the present disclosure, highlighting the relative translation of the translatable upper portion with respect to the fixed lower portion, the attachment of the bumper cover to the translatable upper portion, the attachment of the fixed lower portion to the associated vehicle structure, the relative positioning of the hood in a closed configuration, and the "pinching" of a spacer between the bumper cover and the closed hood to form a desired gap between the bumper cover and the closed hood, in multiple steps.

FIG. 6 shows multiple steps in which the hood 16 is then closed adjacent to the front bumper cover 10 with a removable spacer 50 disposed between the hood 16 and the front bumper cover 10. This removable spacer 50 corresponds to a desired gap width between the hood 16 and the front bumper cover 10. It should be noted that multiple datum brackets 40 and multiple spacers 50 may be disposed across the width of the hood 16 and front bumper cover 10, for example. Once the spacer(s) 50 are placed, the front bumper cover 10 and translatable upper portion(s) 44 of the datum bracket(s) 40 are pushed towards the hood 16 until the upper edge of the front bumper cover 10 is "snugged" against the spacer(s) 50, forming a precise, even gap 14 along the width of the hood 16. This same procedure may, of course, be similarly applied to other components as well.

Figure 7:
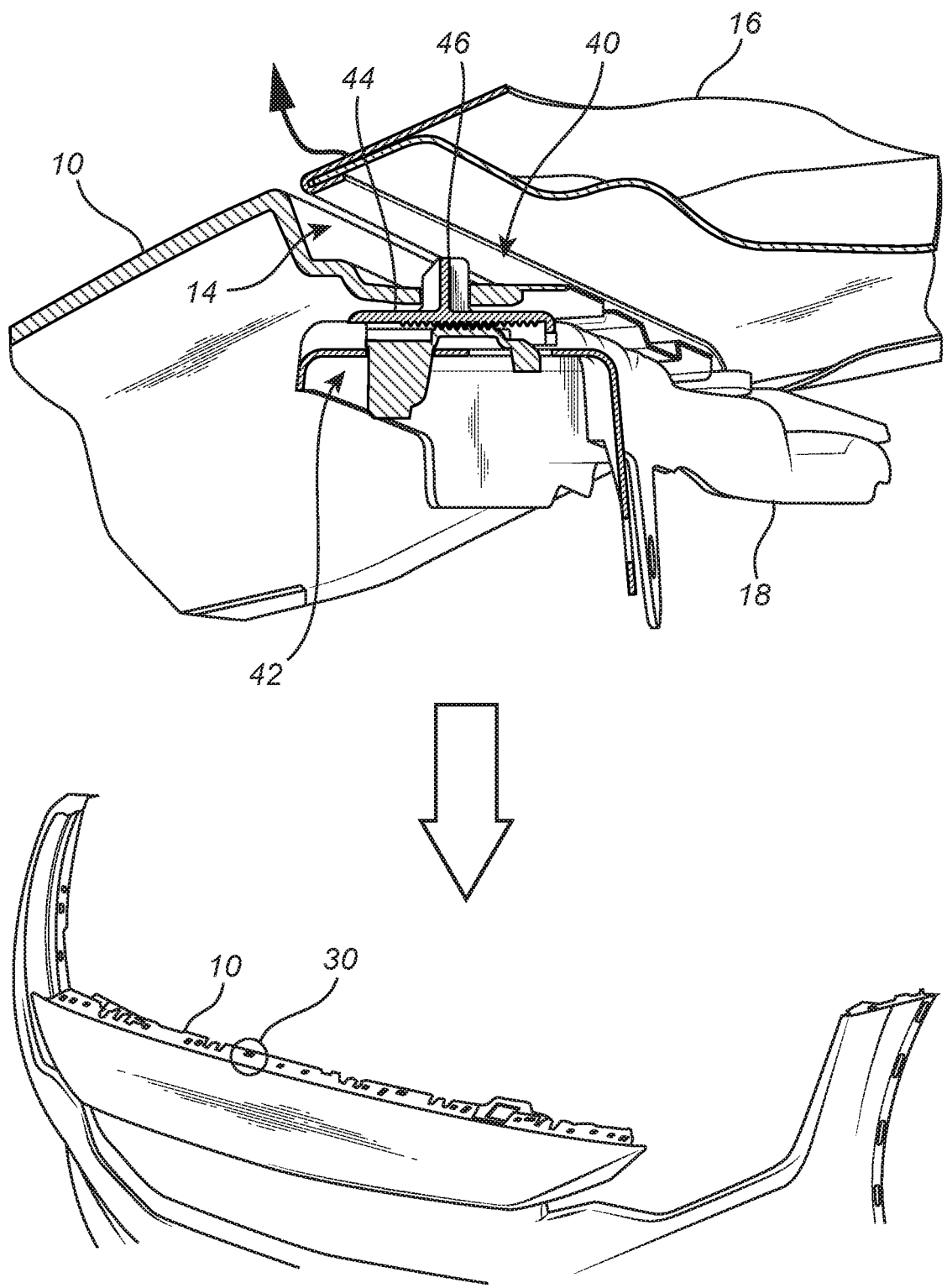
FIG. 7 is a series of perspective views of one exemplary embodiment of the adjustable datum pin assembly of the present disclosure, highlighting the attachment of the bumper cover to the translatable upper portion, the attachment of the fixed lower portion to the associated vehicle structure, the relative positioning of the hood in a closed configuration, the opening of the hood once the desired gap between the bumper cover and the closed hood has been formed, and the permanent securement of the bumper cover to the associated vehicle structure using screws or the like, in multiple steps.

FIG. 7 shows multiple steps in which the spacer(s) 50 is/are then removed and the hood 16 is opened, with the front bumper cover 10 be held temporarily but securely in the desired configuration with respect to the now-opened hood 16 by the datum bracket 40. Subsequently, the front bumper cover 10 is permanently secured using one or more screws 30 or other fastening mechanisms. Again, this same procedure may, of course, be similarly applied to other components as well, and repeated readjustment is advantageously possible before final securement using the datum bracket 40 of the present disclosure.

Figure 8:
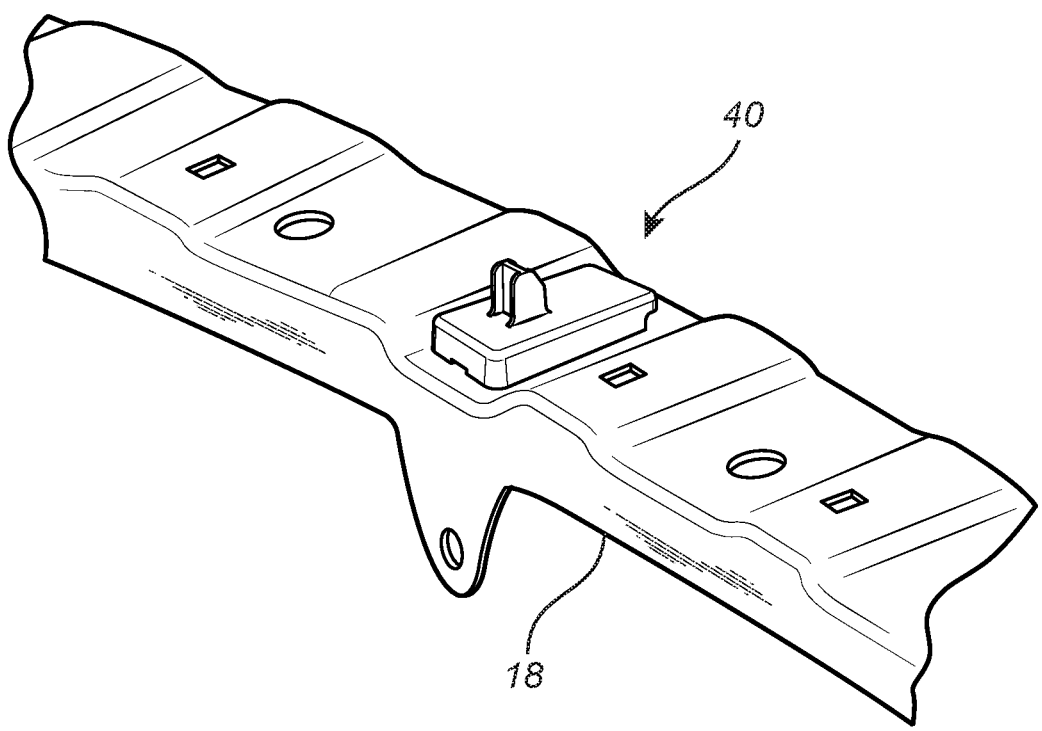
FIG. 8 is a perspective view of one exemplary embodiment of the adjustable datum pin assembly of the present disclosure coupled to a crossmember of a vehicle.

FIG. 8 shows the datum bracket 40 coupled to the associated crossmember 50 (or frame member or other vehicle structure) in isolation.

Figure 9:
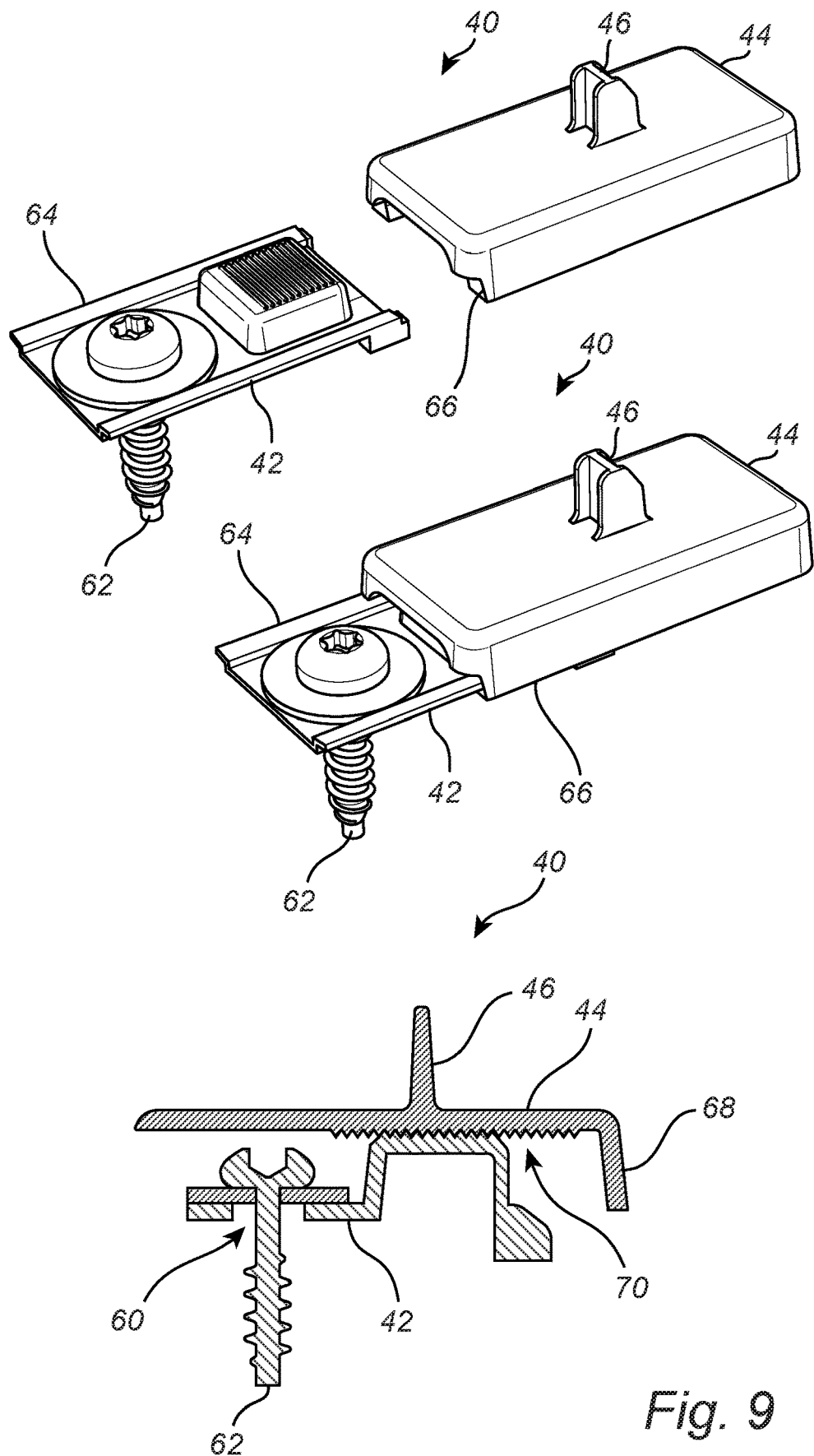
FIG. 9 is a series of perspective views and a cross-sectional view of one exemplary embodiment of the adjustable datum pin assembly of the present disclosure, highlighting the translatable attachment of the translatable upper portion to the fixed lower portion and the friction mechanism disposed therebetween, with the fixed lower portion being coupled to the associated vehicle structure using a screw.
Figure 10:
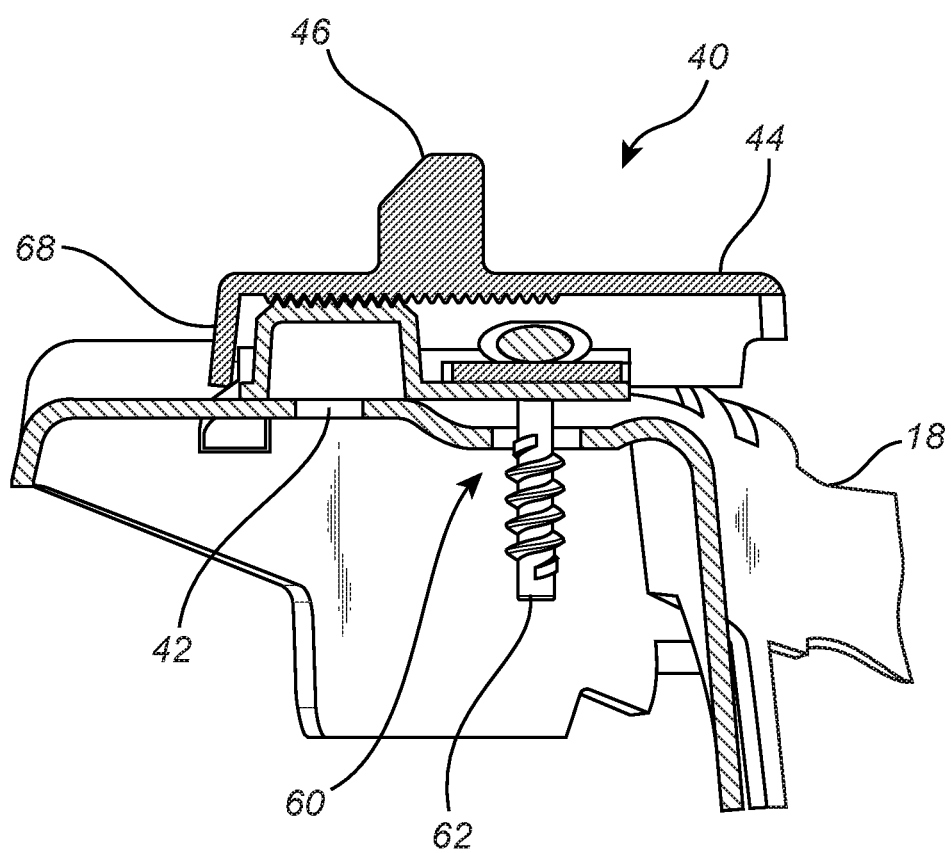
FIG. 10 is a perspective view of one exemplary embodiment of the adjustable datum pin assembly of the present disclosure, highlighting the translatable attachment of the translatable upper portion to the fixed lower portion and the friction mechanism disposed therebetween, with the fixed lower portion being coupled to the associated vehicle structure using a screw.

Referring now specifically to FIGS. 9 and 10, in one exemplary embodiment, the adjustable datum pin assembly 40 again includes a fixed lower portion 42 that is securely coupled to the crossmember 18 (or other vehicle structure) and a translatable upper portion 44 that is translatably coupled to the fixed lower portion 42. In general, the translatable upper portion 44 is permitted to translate in both directions along a single axis, such as forwards and rearwards with respect to the vehicle 24 (FIG. 2) in the case of an adjustable datum pin assembly 40 intended to hold a front bumper cover 10 (FIGS. 1-7). Other directional axes may be utilized for the securement of other components. The fixed lower portion 42 and the translatable upper portion 44 are each manufactured from a substantially rigid plastic or metallic material and, optionally, consist of substantially planar structures. The fixed lower portion 42 includes a hole 60 through which a screw 62 is used to secure the fixed lower portion 42 to the crossmember 18. The translatable upper portion 44 includes a post structure or clip structure 46 that protrudes from the upper surface of the translatable upper portion 44 and selectively engages a corresponding hole 28 (FIGS. 3, 4) formed in the upper edge of the front bumper cover 10, thereby coupling the front bumper cover 10 to the translatable upper portion 44. This post structure 46 may have a substantially circular cross-sectional shape or, as illustrated, have a substantially prismatic shape consisting of an I-beam structure, a cross structure, or the like.

The translatable upper portion 44 is translatably coupled to the fixed lower portion 42 via a track-and-rail mechanism manufactured into the sides of the translatable upper portion 44 and the fixed lower portion 42. In the exemplary embodiment illustrated, this track-and-rail mechanism consists of an outwardly-protruding flange 64 formed in each of the side portions of the fixed lower portion 42 and an interlocking inwardly-protruding flange 66 formed in each of the side portions of the translatable upper portion 44, although other interlocking translation mechanisms may be used equally. Translation of the translatable upper portion 44 with respect to the fixed lower portion 42 may be bounded by a stop structure 68 disposed at one or both ends of the translatable upper portion 44, generally consisting of a downwardly-protruding flange formed in an end portion of the translatable upper portion 44 that is configured to contact the fixed lower portion 42 upon full relative translation of the two components. A friction mechanism consisting of a plurality of friction structures or teeth 70 formed in one or more of a lower surface of the translatable upper portion 44 and an upper surface of the fixed lower portion 42 is provided to resist translation of the translatable upper portion 44 with respect to the fixed lower portion 42 unless a sufficient force is applied to the translatable upper portion 44 through the post or clip structure 46. Thus, the friction mechanism may provide a plurality of detent positions of the translatable upper portion 44 with respect to the fixed lower portion 42, or a substantially continuous relative position spectrum may be provided. Finally, a locking screw or other mechanism may be used to secure the translatable upper portion 44 with respect to the fixed lower portion 42 in a desired translation configuration, such as when the front bumper cover 10 is in a desired position with respect to the crossmember 18.

Figure 11:
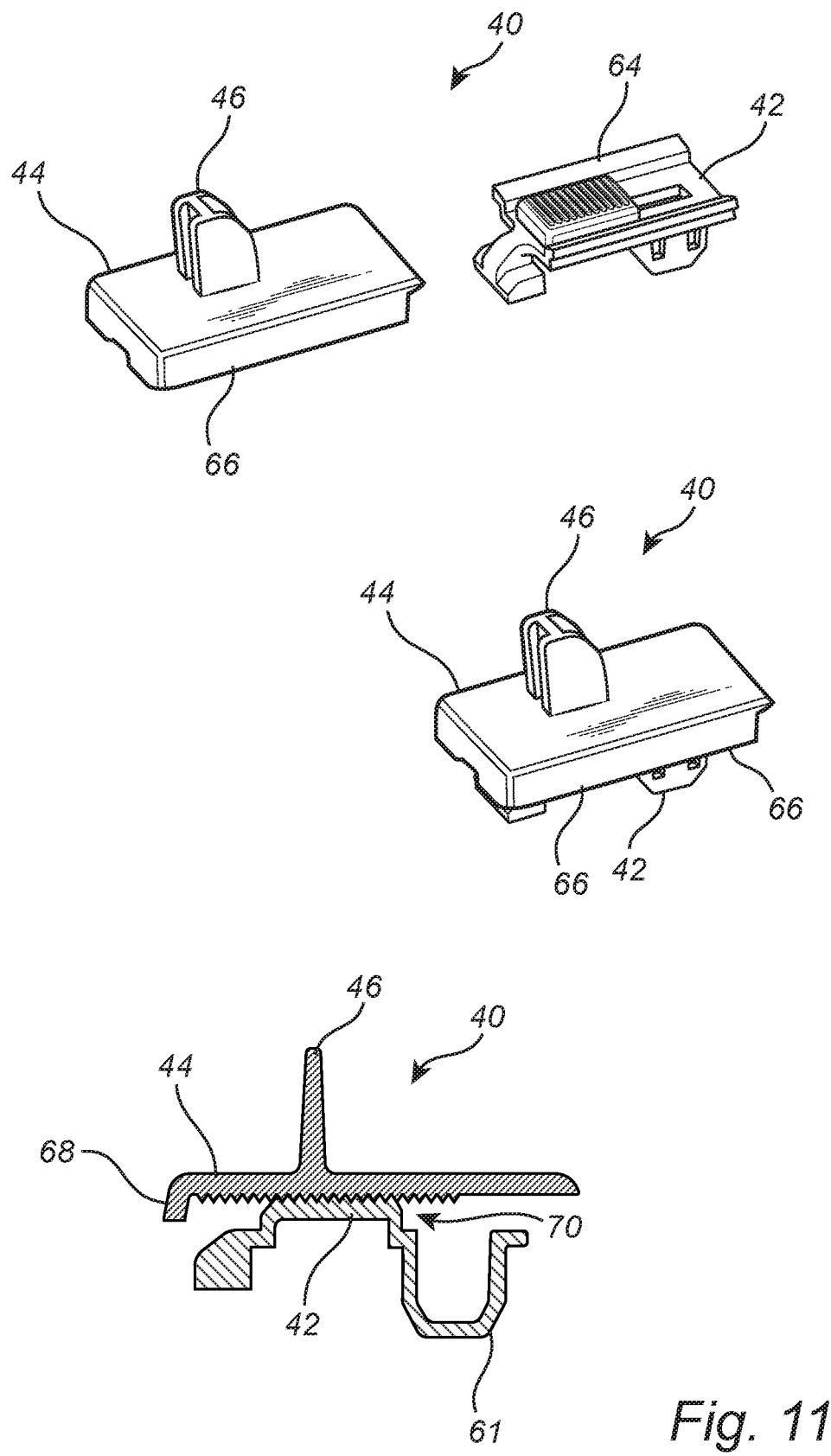
FIG. 11 is a series of perspective views and a cross-sectional view of another exemplary embodiment of the adjustable datum pin assembly of the present disclosure, highlighting the translatable attachment of the translatable upper portion to the fixed lower portion and the friction mechanism disposed therebetween, with the fixed lower portion being coupled to the associated vehicle structure using a clip mechanism.
Figure 12:
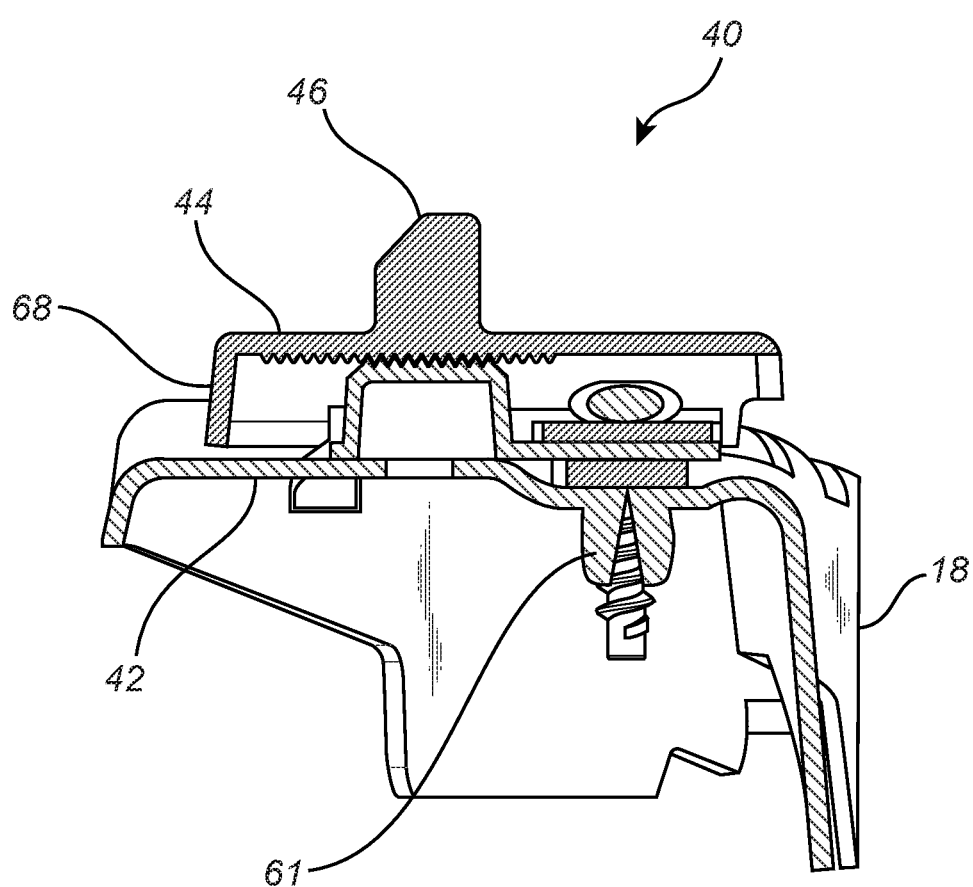
FIG. 12 is a perspective view of another exemplary embodiment of the adjustable datum pin assembly of the present disclosure, highlighting the translatable attachment of the translatable upper portion to the fixed lower portion and the friction mechanism disposed therebetween, with the fixed lower portion being coupled to the associated vehicle structure using a clip mechanism.

Referring now specifically to FIGS. 11 and 12, in another exemplary embodiment, the adjustable datum pin assembly 40 again includes a fixed lower portion 42 that is securely coupled to the crossmember 18 (or other vehicle structure) and a translatable upper portion 44 that is translatably coupled to the fixed lower portion 42. In general, the translatable upper portion 44 is permitted to translate in both directions along a single axis, such as forwards and rearwards with respect to the vehicle 24 (FIG. 2) in the case of an adjustable datum pin assembly 40 intended to hold a front bumper cover 10 (FIGS. 1-7). Other directional axes may be utilized for the securement of other components. The fixed lower portion 42 and the translatable upper portion 44 are each manufactured from a substantially rigid plastic or metallic material and, optionally, consist of substantially planar structures. The fixed lower portion 42 includes clip structure 61 that is used to secure the fixed lower portion 42 to the crossmember 18. The translatable upper portion 44 includes a post structure or clip structure 46 that protrudes from the upper surface of the translatable upper portion 44 and selectively engages a corresponding hole 28 (FIGS. 3, 4) formed in the upper edge of the front bumper cover 10, thereby coupling the front bumper cover 10 to the translatable upper portion 44. This post structure 46 may have a substantially circular cross-sectional shape or, as illustrated, have a substantially prismatic shape consisting of an I-beam structure or the like.

The translatable upper portion 44 is translatably coupled to the fixed lower portion 42 via a track-and-rail mechanism manufactured into the sides of the translatable upper portion 44 and the fixed lower portion 42. In the exemplary embodiment illustrated, this track-and-rail mechanism consists of an outwardly-protruding flange 64 formed in each of the side portions of the fixed lower portion 42 and an interlocking inwardly-protruding flange 66 formed in each of the side portions of the translatable upper portion 44, although other interlocking translation mechanisms may be used equally. Translation of the translatable upper portion 44 with respect to the fixed lower portion 42 may be bounded by a stop structure 68 disposed at one or both ends of the translatable upper portion 44, generally consisting of a downwardly-protruding flange formed in an end portion of the translatable upper portion 44 that is configured to contact the fixed lower portion 42 upon full relative translation of the two components. A friction mechanism consisting of a plurality of friction structures or teeth 70 formed in one or more of a lower surface of the translatable upper portion 44 and an upper surface of the fixed lower portion 42 is provided to resist translation of the translatable upper portion 44 with respect to the fixed lower portion 42 unless a sufficient force is applied to the translatable upper portion 44 through the post or clip structure 46. Thus, the friction mechanism may provide a plurality of detent positions of the translatable upper portion 44 with respect to the fixed lower portion 42, or a substantially continuous relative position spectrum may be provided. Finally, a locking screw or other mechanism may be used to secure the translatable upper portion 44 with respect to the fixed lower portion 42 in a desired translation configuration, such as when the front bumper cover 10 is in a desired position with respect to the crossmember 18.

Thus, a certain degree of adjustability is provided between the bumper cover, fender, side panel, roof spoiler, or the like and the associated vehicle structure, such that the bumper cover, fender, side panel, roof spoiler, or the like can be "snugged" against the associated vehicle structure and held in place while the gap with the closed hood or trunk lid is checked, at which point the bumper cover, fender, side panel, roof spoiler, or the like can be adjusted towards or away from the associated vehicle structure to achieve the desired gap and again held in place, etc., all prior to permanently securing the bumper cover, fender, side panel, roof spoiler, or the like to the associated vehicle structure with screws or the like. Thus, the temporary securement mechanism between the bumper cover, fender, side panel, roof spoiler, or the like and the associated vehicle structure is provided with a degree of adjustability, prior to the permanent securement mechanism being utilized. In this manner, temporary spacers or the like can be fitted and re-fitted between the bumper cover, fender, side panel, roof spoiler, or the like and the hood or trunk lid to ensure a precise gap therebetween.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An adjustable datum pin assembly for temporarily affixing a vehicle component to an associated vehicle structure, the adjustable datum pin assembly comprising:
   a fixed lower portion adapted to be coupled to the associated vehicle structure;
   a translatable upper portion translatably coupled to the fixed lower portion, wherein the translatable upper portion comprises an attachment structure adapted to hold the vehicle component, wherein the attachment structure comprises a protruding post structure adapted to be disposed within a corresponding hole formed along an upper edge of the vehicle component; and a friction mechanism disposed between the translatable upper portion and the fixed lower portion adapted to resist translation of the translatable upper portion with respect to the fixed lower portion;

wherein the translatable upper portion is adapted to translate the vehicle component towards and away from the associated vehicle structure.

2. The adjustable datum pin assembly of claim 1, wherein the fixed lower portion comprises one or both of a screw mechanism and a clip mechanism adapted to couple to the fixed lower portion to the associated vehicle structure.

3. The adjustable datum pin assembly of claim 1, wherein the translatable upper portion is translatably coupled to the fixed lower portion via a track-and-rail mechanism.

4. The adjustable datum pin assembly of claim 1, wherein the post structure of the attachment structure is adapted to be disposed within the corresponding hole formed along the upper edge of the vehicle component such that the vehicle component is hung on the attachment structure.

5. The adjustable datum pin assembly of claim 1, wherein the friction mechanism comprises a plurality of friction structures formed in one or both of a lower surface of the translatable upper portion and an upper surface of the fixed lower portion.

6. The adjustable datum pin assembly of claim 1, further comprising a locking screw adapted to prevent translation of the translatable upper portion with respect to the fixed lower portion.

7. A vehicle assembly comprising a vehicle component affixed to an associated vehicle structure, the vehicle assembly formed by the process comprising:

coupling the vehicle component to one or more adjustable datum pin assemblies secured to the associated vehicle structure, wherein each of the one or more adjustable datum pin assemblies comprises:

a fixed lower portion adapted to be coupled to the associated vehicle structure;

a translatable upper portion translatably coupled to the fixed lower portion, wherein the translatable upper portion comprises an attachment structure adapted to hold the vehicle component, wherein the attachment structure comprises a protruding post structure adapted to be disposed within a corresponding hole formed along an upper edge of the vehicle component; and a friction mechanism disposed between the translatable upper portion and the fixed lower portion adapted to resist translation of the translatable upper portion with respect to the fixed lower portion;

wherein the translatable upper portion is adapted to translate the vehicle component towards and away from the vehicle structure; and adjusting the relative position of the vehicle component with respect to the associated vehicle structure by translating the translatable upper portion(s) of the one or more adjustable datum pin assemblies with respect to the fixed lower portion(s) of the one or more adjustable datum pin assemblies with a sufficient amount of force to achieve a desired gap between an upper edge of the vehicle component and an adjacent hood or trunk lid.

8. The vehicle assembly of claim 7, wherein the process further comprises, subsequent to adjusting the relative position of the vehicle component with respect to the associated vehicle structure, securing the vehicle component to the associated vehicle structure using a screw.

9. The vehicle assembly of claim 7, wherein adjusting the relative position of the vehicle component with respect to the associated vehicle structure by translating the translatable upper portion(s) of the one or more adjustable datum pin assemblies with respect to the fixed lower portion(s) of the one or more adjustable datum pin assemblies with a sufficient amount of force to achieve the desired gap between the upper edge of the vehicle component and the adjacent hood or trunk lid comprises "pinching" a removable spacer between the upper edge of the vehicle component and the adjacent hood or trunk lid.

10. The vehicle assembly of claim 7, wherein the fixed lower portion comprises one or both of a screw mechanism and a clip mechanism adapted to couple to the fixed lower portion to the associated vehicle structure.

11. The vehicle assembly of claim 7, wherein the translatable upper portion is translatably coupled to the fixed lower portion via a track-and-rail mechanism.

12. The vehicle assembly of claim 7, wherein the post structure of the attachment structure is adapted to be disposed within the corresponding hole formed along the upper edge of the vehicle component such that the vehicle component is hung on the attachment structure.

13. The vehicle assembly of claim 7, wherein the friction mechanism comprises a plurality of friction structures formed in one or both of a lower surface of the translatable upper portion and an upper surface of the fixed lower portion.

14. The vehicle assembly of claim 7, wherein the adjustable datum pin assembly further comprises a locking screw adapted to prevent translation of the translatable upper portion with respect to the fixed lower portion.

15. The vehicle assembly of claim 7, wherein the process further comprises locking the translatable upper portion of the adjustable datum pin assembly to the fixed lower portion of the adjustable datum pin assembly after adjusting the relative position of the vehicle component with respect to the associated vehicle structure.

16. The adjustable datum pin assembly of claim 1, wherein the translatable upper portion is adapted to translate the vehicle component towards and away from the associated vehicle structure and, correspondingly, towards and away from an edge of a hood or trunk lid coupled to the associated vehicle structure.

17. The adjustable datum pin assembly of claim 16, wherein the translatable upper portion is adapted to translate the vehicle component towards and away from the associated vehicle structure and, correspondingly, towards and away from an edge of a hood or trunk lid coupled to the associated vehicle structure such that a width of a gap between the vehicle component and the edge of the hood or trunk lid may be controlled.

18. The adjustable datum pin assembly of claim 1, wherein the attachment structure is adapted to hold an upper edge of the vehicle component such that a portion of the vehicle component is hung adjacent to the associated vehicle structure.

19. The adjustable datum pin assembly of claim 18, wherein the translatable upper portion is adapted to translate the vehicle component towards and away from the associated vehicle structure perpendicular to the portion of the vehicle component hung adjacent to the associated vehicle structure.

20. The adjustable datum pin assembly of claim 1, wherein the protruding post structure is disposed on a side of the translatable upper portion opposite the friction mechanism disposed between the translatable upper portion and the fixed lower portion.

* * * * *